US011653647B2

(12) United States Patent
Sagliano

(10) Patent No.: US 11,653,647 B2
(45) Date of Patent: May 23, 2023

(54) HERBICIDAL COMPOSITIONS BASED ON NONANOIC ACID AND KETOACIDS

(71) Applicant: NOVAMONT S.P.A., Novara (IT)

(72) Inventor: Angela Sagliano, Novara (IT)

(73) Assignee: NOVAMONT S.P.A., Novara (IT)

( * ) Notice: Subject to any disclaimer, the term of this patent is extended or adjusted under 35 U.S.C. 154(b) by 310 days.

(21) Appl. No.: 16/635,324

(22) PCT Filed: Jul. 31, 2018

(86) PCT No.: PCT/EP2018/070785
§ 371 (c)(1),
(2) Date: Jan. 30, 2020

(87) PCT Pub. No.: WO2019/030062
PCT Pub. Date: Feb. 14, 2019

(65) Prior Publication Data
US 2020/0154706 A1 May 21, 2020

(30) Foreign Application Priority Data
Aug. 2, 2017 (IT) .................. 102017000088554

(51) Int. Cl.
*A01N 37/02* (2006.01)
*A01N 25/04* (2006.01)
*A01N 25/30* (2006.01)
*A01N 37/42* (2006.01)

(52) U.S. Cl.
CPC ............ *A01N 37/02* (2013.01); *A01N 25/04* (2013.01); *A01N 25/30* (2013.01); *A01N 37/42* (2013.01)

(58) Field of Classification Search
CPC combination set(s) only.
See application file for complete search history.

(56) References Cited

U.S. PATENT DOCUMENTS

| 4,975,110 A * | 12/1990 | Puritch | A01N 37/02 |
| | | | 504/142 |
| 5,098,468 A * | 3/1992 | Puritch | A01N 37/02 |
| | | | 504/142 |
| 5,106,410 A * | 4/1992 | Puritch | A01N 37/02 |
| | | | 504/142 |
| 5,196,044 A * | 3/1993 | Caulder | A01N 37/02 |
| | | | 504/144 |
| 6,204,220 B1 | 3/2001 | Jordan et al. | |
| 7,820,594 B2 * | 10/2010 | Coleman | A01N 37/02 |
| | | | 504/116.1 |
| 2007/0249699 A1* | 10/2007 | Coleman | A01N 37/02 |
| | | | 514/567 |

FOREIGN PATENT DOCUMENTS

| CN | 104083900 A | | 10/2014 |
| EP | 0 868 849 A1 | | 10/1998 |
| GB | 1318843 | * | 5/1973 |
| WO | WO 91/05471 A1 | | 5/1991 |
| WO | WO 91/05472 A1 | | 5/1991 |

OTHER PUBLICATIONS

Mayr et al. (Zeitschrift fuer Pflanzenernaehrung und Bodenkunde, 1977, vol. 140, Issue: 3-4, pp. 463-472: Abstract obtained via SciFinder). (Year: 1977).*
Machine translation of CN 104083900 (2014).*
Hatzios et al., "Pelargonic acid", WAASA Herbicide Handbook-Supplement to 7th Edition, 1991, pp. 55-57.
Okano et al., "Novel regioselective hydrogenation of aldadienoic acids caused by the addition of water", Tetrahedron Letters, vol. 33, No. 38, pp. 5547-5550, 1992.
CIPAC Handbook, vol. F, Analysis of Technical and Formulated Pesticides, Miscellaneous Techniqyes and Impurities—MT 18 Standard Waters, 2007, pp. 59-69.
CIPAC Handbook, vol. F, Analysis of Technical and Formulated Pesticides, Miscellaneous Techniqyes and Impurities—MT 35 Oil Insoluble Material, 2007, pp. 108-115.
CIPAC Handbook, vol. F, Analysis of Technical and Formulated Pesticides, Miscellaneous Techniques and Impurities—MT 18 Standard Waters, 2007, pp. 59-69.
CIPAC Handbook, vol. F, Analysis of Tech and Formulated Pesticides, Miscellaneous Tech, and Impurities—MT 36 Emulsion Charateristics of Emulsifiable Concen, 2007, pp. 108-115.
CA First Office Action dated Mar. 22, 2021 in counterpart CN Appln. 201880062740.4.

* cited by examiner

*Primary Examiner* — John Pak
(74) *Attorney, Agent, or Firm* — Polsinelli PC

(57) ABSTRACT

The present invention relates to a composition comprising a saturated nonanoic acid and/or a saturated nonanoic acid salt, at least one ketoacid and at least one emulsifying agent, to a process for preparing said composition and to the use of said composition in herbicidal applications.

16 Claims, No Drawings

HERBICIDAL COMPOSITIONS BASED ON NONANOIC ACID AND KETOACIDS

CROSS REFERENCE TO RELATED APPLICATIONS

This application is a National Phase filing under 35 U.S.C. § 371 of PCT/EP2018/070785 filed on 31 Jul. 2018; which application in turn claims priority to Application No. 102017000088554 filed in Italy on 02 Aug. 2017. The entire contents of each application are hereby incorporated by reference.

The present invention relates to a composition comprising a saturated nonanoic acid, at least one ketoacid and at least one emulsifying agent, to a process for preparing said composition and to the use of said composition in herbicidal applications.

Pesticides are chemical substances used in agriculture for eliminating parasitic organisms (animals or plants) which damage crop plants and compromise soil productivity and crop quality.

Plant-protection products, also known as phytosanitary products, are specific types of pesticidal products generally intended for one or the following uses: protecting plants or plant products from all harmful organisms or preventing the effects of the latter, influencing the living processes of the plants, as in the case of substances, other than nutrients, which influence their growth, preserving plant products, destroying weed plants or parts thereof, or controlling or avoiding unwanted plant growth. Plant-protection products include herbicides, or weedkillers, which are substances used for controlling weed plants.

Herbicides may act selectively or completely (non-selectively). Selectivity of the herbicidal function is substantially determined by the nature of the active ingredient and furthermore by the concentration thereof, by the method by which the herbicide is applied to the soil or plants and even by the mechanical vehicle used for distributing it.

Herbicides applied onto foliage may act both locally, with a harmful action on the leaf tissues and buds, and by a general mechanism once the substance has been absorbed and translocated into the root parts of the plant (systemic or translocation herbicides). Herbicides applied onto the soil act by directly damaging the root system or by preventing seed germination.

Another classification divides herbicides into pre-emergence herbicides, which attack the weeds at the seedling stage by stopping their development before they can compete with the crop species, and post-emergence herbicides which eliminate the weed once it has developed. Pre-emergence herbicides tend to leave residues in the ground which may be disadvantageous for the environment.

Compositions based on fatty acids for use in herbicidal applications are known in the literature. See, for instance, WO 91/05471 and WO 91/05472 patent applications.

In particular, nonanoic acid acts against a wide range of annual and perennial weeds, both mono- and dicotyledons, algae and mosses. Its herbicidal action typically occurs in post-emergence of the weeds i.e. acting by contact with the foliage. Nonanoic acid generally acts as a desiccant by contact with the aerial parts of the weed plants onto which the product is applied.

As stated in the WAASA Herbicide Handbook (Jan. 1, 1998, p. 55-57), a nonanoic acid commercially available under the trade name "Scythe" is a contact, non-selective, broad spectrum, foliar-applied herbicide which can be used to control actively growing of emerged green vegetation.

Furthermore, nonanoic acid has no residual action and thus does not pollute the ground.

However, among drawbacks related to the usage of nonanoic acid in herbicidal applications it can be mentioned that its period of control of weed plants is not sufficiently long due to regrowth of most of the weeds.

Also, it is generally necessary to formulate concentrated compositions of fatty acids which can be diluted in water before use and which retain their herbicidal activity intact.

The resultant aqueous formulations must be stable and must not exhibit phase separation so they can be conveniently stored before use.

Furthermore, the resultant aqueous formulations must not foam during preparation so as to improve the homogeneous distribution of the active substances under field service conditions by means of appropriate equipment.

There is accordingly still a need to find an alternative herbicidal composition to those commercially available which can be formulated easily while minimizing the addition of stabilizers and/or coadjuvants, such as for example antifoam agents, so that it can, when required, be quickly diluted in water so as to obtain a stable, ready-to-use, water-based emulsion, while maintaining its effectiveness in herbicidal applications.

The Applicant has now surprisingly found a composition which solves the above-stated technical problem.

In particular, the Applicant has unexpectedly found that the composition according to the present invention, said composition containing a mixture of nonanoic acid with at least one ketoacid and an emulsifying agent, is surprisingly highly effective as a non-selective herbicide and unexpectedly exhibits a longer period of control of weed plants as compared to commercially available nonanoic acid based-herbicides.

It has in fact been found that the ketoacid has a coadjuvant effect on the herbicidal activity of nonanoic acid as an active ingredient and surprisingly boosts its herbicidal effectiveness in compositions containing nonanoic acid even at a low active ingredient content.

Furthermore, the composition according to the present invention has high stability and may advantageously be diluted in water so as to give rise to a stable, water-based emulsion.

A first aspect of the present invention relates to a composition comprising:

a) a mixture of saturated aliphatic monocarboxylic acids comprising:
nonanoic acid, and
at least one ketoacid having the following formula (I):

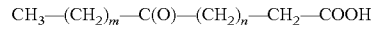

$$CH_3-(CH_2)_m-C(O)-(CH_2)_n-CH_2-COOH$$

wherein the sum (m+n) equals 4 or 5, preferably 5, with m and n which individually represent 0 or an integer selected from 1, 2, 3, 4 and 5, and b) an emulsifying agent, in which the mixture of saturated aliphatic monocarboxylic acids comprises:

20-99% by weight, based on the total weight of nonanoic acid and at least one ketoacid having the formula (I), of nonanoic acid, and 1-80% by weight, based on the total weight of nonanoic acid and at least one ketoacid having the formula (I), of said ketoacid having the formula (I).

The composition according to the invention may easily be formulated and conveniently has a high stability so that it may advantageously be stored and transported.

Furthermore, the composition according to the invention is surprisingly effective as an advantageously non-selective herbicide.

The composition according to the invention is typically in the liquid phase.

The mixture of saturated aliphatic monocarboxylic acids of the composition according to the present invention preferably comprises:
- 25-99% by weight, based on the total weight of nonanoic acid and at least one ketoacid having the formula (I), of nonanoic acid, and
- 1-75% by weight, based on the total weight of nonanoic acid and at least one ketoacid having the formula (I), of said ketoacid having the formula (I).

The mixture of saturated aliphatic monocarboxylic acids of the composition according to the present invention more preferably comprises:
- 50-99% by weight, based on the total weight of nonanoic acid and at least one ketoacid having the formula (I), of nonanoic acid, and
- 1-50% by weight, based on the total weight of nonanoic acid and at least one ketoacid having the formula (I), of said ketoacid having the formula (I).

The mixture of saturated aliphatic monocarboxylic acids of the composition according to the present invention even more preferably comprises:
- 75-99% by weight, based on the total weight of nonanoic acid and at least one ketoacid having the formula (I), of nonanoic acid, and
- 1-25% by weight, based on the total weight of nonanoic acid and at least one ketoacid having the formula (I), of said ketoacid having the formula (I).

The composition according to the present invention preferably comprises:
a) 10-85% by weight, based on the total weight of the composition, of a mixture of saturated aliphatic monocarboxylic acids comprising:
   nonanoic acid, and
   at least one ketoacid having the formula (I),
   in which the mixture of saturated aliphatic monocarboxylic acids comprises:
   20-99% by weight, based on the total weight of nonanoic acid and at least one ketoacid having the formula (I), of nonanoic acid, and
   1-80% by weight, based on the total weight of nonanoic acid and at least one ketoacid having the formula (I), of said ketoacid having the formula (I),
b) 5-40% by weight, based on the total weight of the composition, of an emulsifying agent,
c) 0-50% by weight, based on the total weight of the composition, of at least one solvent, and
d) 0-30% by weight, based on the total weight of the composition, of water.

If the composition according to the present invention further comprises at least one solvent, said composition typically comprises 5-40% by weight, based on the total weight of the composition, of at least one solvent.

If the composition according to the present invention further comprises water, said composition typically comprises 5-20% by weight, based on the total weight of the composition, of water.

In a first embodiment of the present invention, the composition according to the invention preferably comprises:
a) 60-85% by weight, based on the total weight of the composition, of a mixture of saturated aliphatic monocarboxylic acids comprising:
   nonanoic acid, and
   at least one ketoacid having the formula (I),
   in which the mixture of saturated aliphatic monocarboxylic acids comprises:
   20-99% by weight, based on the total weight of nonanoic acid and at least one ketoacid having the formula (I), of nonanoic acid, and
   1-80% by weight, based on the total weight of nonanoic acid and at least one ketoacid having the formula (I), of said ketoacid having the formula (I), and
b) 15-40% by weight, based on the total weight of the composition, of an emulsifying agent.

The composition of this first embodiment of the present invention more preferably comprises:
a) 70-80% by weight, based on the total weight of the composition, of a mixture of saturated aliphatic monocarboxylic acids comprising:
   nonanoic acid, and
   at least one ketoacid having the formula (I),
   in which the mixture of saturated aliphatic monocarboxylic acids comprises:
   20-99% by weight, based on the total weight of nonanoic acid and at least one ketoacid having the formula (I), of nonanoic acid, and
   1-80% by weight, based on the total weight of nonanoic acid and at least one ketoacid having the formula (I), of said ketoacid having the formula (I), and
b) 20-30% by weight, based on the total weight of the composition, of an emulsifying agent.

In a second embodiment of the present invention, the composition according to the invention preferably comprises:
a) 10-60% by weight, based on the total weight of the composition, of a mixture of saturated aliphatic monocarboxylic acids comprising:
   nonanoic acid, and
   at least one ketoacid having the formula (I),
   in which the mixture of saturated aliphatic monocarboxylic acids comprises:
   20-99% by weight, based on the total weight of nonanoic acid and at least one ketoacid having the formula (I), of nonanoic acid, and
   1-80% by weight, based on the total weight of nonanoic acid and at least one ketoacid having the formula (I), of said ketoacid having the formula (I),
b) 10-30% by weight, based on the total weight of the composition, of an emulsifying agent,
c) 10-40% by weight, based on the total weight of the composition, of at least one solvent, and
d) 10-20% by weight, based on the total weight of the composition, of water.

The composition according to this embodiment of the present invention more preferably comprises:
a) 10-40% by weight, based on the total weight of the composition, of a mixture of saturated aliphatic monocarboxylic acids comprising:
   nonanoic acid, and
   at least one ketoacid having the formula (I),
   in which the mixture of saturated aliphatic monocarboxylic acids comprises:
   20-99% by weight, based on the total weight of nonanoic acid and at least one ketoacid having the formula (I), of nonanoic acid, and
   1-80% by weight, based on the total weight of nonanoic acid and at least one ketoacid having the formula (I), of said ketoacid having the formula (I), b) 10-30% by weight, based on the total weight of the composition, of an emulsifying agent, c) 10-40% by weight, based on the total weight of the composition, of at least one solvent, and d) 10-20% by weight, based on the total weight of the composition, of water.

According to one embodiment of the present invention, the nonanoic acid may be used in form of a nonanoic acid salt, typically in the form of a nonanoic acid ammonium salt.

The nonanoic acid of the composition according to the present invention is generally produced from a vegetable oil. The vegetable oil used in producing nonanoic acid appropriate for use in the composition according to the present invention is typically selected from the group consisting of sunflower oil, oils from Brassicaceae such as *Crambe abyssinica, Brassica carinata, Brassica napus* (rape), and oils from Cardueae such as *Cynara cardunculus* (cardoon). The nonanoic acid of the composition according to the present invention is preferably produced from sunflower oil or cardoon oil.

The nonanoic acid of the composition according to the present invention is advantageously produced by an oxidative cleavage process of a vegetable oil, preferably sunflower oil or cardoon oil, typically in the presence of one or more oxidizing agents, as described, for example, in patent EP 2 519 489. The oxidative cleavage process of a vegetable oil is advantageously carried out in the absence of ozone.

The oxidative cleavage process of a vegetable oil is generally distinguished from processes commonly known in the art for producing saturated aliphatic monocarboxylic acids, in particular nonanoic acid, such as, for example, the ozonolysis process for rapeseed or tallow oil or the hydroformylation process for olefins, in particular 1-octene.

The ketoacids having the formula (I) of the composition according to the present invention are generally produced from a vegetable oil.

Specific, non-limiting examples of ketoacids having the formula (I) include, for example, the following:

$$CH_3-(CH_2)_{m'}-C(O)-CH_2-COOH \quad (I\text{-}A),$$

wherein m' is 4 or 5, and

$$CH_3-(CH_2)_{m''}-C(O)-CH_2-CH_2-COOH \quad (I\text{-}B),$$

wherein m'' is 3 or 4.

The saturated aliphatic monocarboxylic acids of the composition according to the present invention may be characterized using a commonly known technique, typically by gas chromatography (GC), preferably combined with mass spectrometry (MS) (GC-MS).

The mixture of saturated aliphatic monocarboxylic acids of the composition according to the invention may further comprise at least one saturated aliphatic monocarboxylic acid other than nonanoic acid and the ketoacid having the formula (I).

The mixture of saturated aliphatic monocarboxylic acids of the composition according to the invention may typically comprise up to 10% by weight, preferably 1-5% by weight, based on the total weight of the mixture, of at least one saturated aliphatic monocarboxylic acid other than nonanoic acid and the ketoacid having the formula (I), if present.

Any further saturated aliphatic monocarboxylic acids, if present, are selected from the group consisting of caprylic acid, capric acid, undecanoic acid, 10-undecanoic acid, lauric acid, myristic acid, palmitic acid, oleic acid, ricinoleic acid and mixtures thereof.

The mixture of saturated aliphatic monocarboxylic acids of the composition according to the present invention may comprise at least one further herbicidal agent other than nonanoic acid. Any further herbicidal agents are selected from the group which consists of glyphosates, sulfonylureas, carfentrazone-ethyl, the derivatives thereof and the mixtures thereof.

Specific, non-limiting examples of herbicides include, for example, the following active ingredients: aclonifen, amidosulfuron, aminopyralid, azimsulfuron, benfluralin, bensulfuron-methyl, bifenox, bispyrac-sodium, cyhalofop-butyl, cycloxidim, cyprosulfamide, clethodim, clodinafop-propargyl, clomazone, clopyralid, cloquintocet-mexyl, chlorotoluron, chlorpropham, chlorsulfuron, dazomet, desmedipham, dicamba, diclofop-methyl, diflufenican, dimethenamid-P, ethofumesate, ethoxysulfuron, fenclorim, fenoxaprop-P-ethyl, flazasulfuron, florasulam, fluazifop-P-butyl, flufenacet, fluroxypyr, foramsulfuron, glyphosate, glyphosate trimesium, glyphosate ammonium, haloxyfop-P, imazamox, imazosulfuron, iodosulfuron-methyl-sodium, ioxynil, isoproturon, isoxaben, isoxaflutole, lenacil, mesosulfuron-methyl, mesotrione, metamitron, metam-sodium, methazachlor, metobromuron, metosulam, metribuzin, metsulfuron-methyl, nicosulfuron, orthosulfamuron, oxadiargyl, oxadiazon, oxasulfuron, oxyfluorfen, pendimethalin, penoxsulam, pethoxamid, picolinafen, pyridate, propyzamide, prosulfuron, pyraflufen-ethyl, rimsulfuron, S-metolachlor, sulcotrione, sulfosulfuron, tembotrione, terbuthylazine, thifensulfuron-methyl, triallate, tralkoxydim, triasulfuron, tribenuron-methyl, triflusulfuron-methyl and tritosulfuron.

The composition according to the invention may further comprise at least one unsaturated aliphatic monocarboxylic acid.

Specific, non-limiting examples of unsaturated aliphatic monocarboxylic acids include, for example, monounsaturated aliphatic monocarboxylic nonanoic acids.

The emulsifying agent of the composition according to the present invention typically comprises at least one surfactant selected from the group consisting of nonionic surfactants and amphoteric surfactants.

For the purposes of the present invention, the term "nonionic surfactant" is understood to mean a surfactant bearing no electric charge and containing a hydrophilic moiety and a lipophilic moiety.

The nonionic surfactant is preferably selected from the group consisting of alkoxylated alcohols, alkoxylated tristyrylphenols, polyethoxylated fatty acid esters and polyethoxylated vegetable oils.

Examples of alkoxylated alcohols include, for example, ethylene oxide-propylene oxide copolymers as ethylene oxide-propylene oxide block copolymers or ethylene oxide-propylene oxide random copolymers.

Examples of polyethoxylated fatty acid esters include, for example, polyethoxylated derivatives of at least partial esters of sorbitan with one of the following fatty acids: lauric acid, palmitic acid, stearic acid or oleic acid, in particular polyethoxylated derivatives of 3,6-sorbitan monoesters with oleic acid.

Specific, non-limiting examples of polyethoxylated derivatives of 3,6-sorbitan monoesters with oleic acid include, for example, those containing oxyethylene units in a quantity of between 20 and 50 moles, more preferably between 25 and 40 moles.

Examples of polyethoxylated vegetable oils include, for example, polyethoxylated derivatives of aliphatic carboxylic acid triglycerides, in particular saturated and/or unsaturated aliphatic $C_{14}$-$C_{20}$ carboxylic acids.

Specific, non-limiting examples of polyethoxylated derivatives of aliphatic carboxylic acid triglycerides include, for example, polyethoxylated castor oil.

Polyethoxylated castor oil preferably contains oxyethylene units in a quantity of between 20 and 50 moles, more preferably between 25 and 40 moles.

The molar content of oxyethylene units in the polyethoxylated fatty acids and in the polyethoxylated vegetable oils of the composition according to the invention may be determined according to any of the methods commonly known in the prior art.

Nonionic surfactants appropriate for use in the emulsifying agent of the composition according to the invention preferably have a hydrophilic-lipophilic balance (HLB) value of greater than or equal to 12.

The hydrophilic-lipophilic balance (HLB) is a measurement of the degree of hydrophilicity of an emulsifying agent.

The hydrophilic-lipophilic balance (HLB) values of the nonionic surfactants used in the emulsifying agent of the composition according to the invention are typically measured according to any of the methods commonly known in the prior art.

For the purposes of the present invention, the term "amphoteric surfactant" is understood to mean a surfactant which behaves as a cationic surfactant in an acidic environment or as an anionic surfactant in an alkaline environment.

The amphoteric surfactant is preferably selected from the group consisting of alkyl betaines.

The composition according to the invention may furthermore comprise at least one organic solvent.

Organic solvents appropriate in the composition according to the invention are typically selected from the group consisting of water-insoluble organic solvents.

Water-insoluble organic solvents are typically selected from the group consisting of aliphatic hydrocarbons, carboxylic acid esters such as, for example, diesters of dicarboxylic acids or ester amides of dicarboxylic acids, alcohols, glycols, polyalkylene glycols, vegetable oils and esters of vegetable oils.

A second aspect of the present invention relates to a process for the production of the composition according to the invention, said process comprising mixing, typically with stirring, of a composition comprising:
a) a mixture of saturated aliphatic monocarboxylic acids comprising:
nonanoic acid, and
at least one ketoacid having the formula (I) as defined above, and
b) an emulsifying agent,
in which the mixture of saturated aliphatic monocarboxylic acids comprises:
20-99% by weight, based on the total weight of nonanoic acid and at least one ketoacid having the formula (I), of nonanoic acid, and
1-80% by weight, based on the total weight of nonanoic acid and at least one ketoacid having the formula (I), of said ketoacid having the formula (I).

A person skilled in the art will adapt the process conditions so as to obtain a homogeneous composition.

The composition used in the process according to the present invention is defined as above.

A third aspect of the present invention relates to an aqueous emulsion comprising:
the composition according to the invention, and
an aqueous phase.

The emulsion according to the present invention is advantageously prepared by diluting the composition according to the present invention in an aqueous phase.

The aqueous emulsion according to the present invention typically comprises:
0.1-10% by volume, based on the total volume of the aqueous emulsion, of the composition according to the invention, and
90-99.9% by volume, based on the total volume of the aqueous emulsion, of an aqueous phase.

The aqueous emulsion according to the present invention preferably comprises:
0.1-8% by volume, based on the total volume of the aqueous emulsion, of the composition according to the invention, and
92-99.9% by volume, based on the total volume of the aqueous emulsion, of an aqueous phase.

For the purposes of the present invention, the term "emulsion" is understood to mean a disperse system composed of two immiscible liquid phases stabilized by an emulsifying agent. The emulsion typically has two immiscible liquid phases, one of which is dispersed in the other, in the form of droplets generally of an average diameter of between 0.5 μm and 100 μm.

An emulsion thus differs from a mixture in which two immiscible liquid phases are separate from one another.

The aqueous emulsion according to the invention is advantageously an oil in water emulsion.

The aqueous phase typically comprises water and, optionally, an organic solvent.

The aqueous phase preferably substantially consists of water.

The Applicant has surprisingly found that the aqueous emulsion according to the invention is surprisingly stable over a broad temperature range, typically between 4° C. and 30° C., addition of stabilizers and/or coadjuvants, such as for example antifoam agents, being minimized, and may advantageously be stored. Indeed, no phase separation is observed in the aqueous emulsion according to the invention whether over short or long periods of time. Furthermore, no foaming is observed during the steps of preparation and storage of the resultant aqueous emulsion.

The aqueous emulsion according to the invention exhibits excellent herbicidal activity.

In particular, the aqueous emulsion according to the invention exhibits excellent non-selective herbicidal activity and is particularly effective as a post-emergence herbicide.

A fourth aspect of the present invention accordingly relates to the use of the aqueous emulsion as a herbicide.

According to one embodiment of the present invention, the aqueous emulsion may be used as a herbicide with a desiccant action.

A fifth aspect of the present invention relates to a method for controlling or suppressing plant growth, said method comprising application of the aqueous emulsion according to the invention to the plant.

The aqueous emulsion according to the invention is typically applied to the plant by spraying, said spraying generally being directed at the base or the leaves of the plant.

The following examples illustrate the present invention in non-limiting manner.

Materials

Mixture (hereinafter denoted "mixture A") containing:
54% by weight, based on the total weight of nonanoic acid and ketoacids having the formula (I), of nonanoic acid, 46% by weight, based on the total weight of nonanoic acid and ketoacids having the formula (I), of ketoacids having the formula (I).

Mixture (hereinafter denoted "mixture B") containing:
92% by weight, based on the total weight of nonanoic acid and ketoacids having the formula (I), of nonanoic acid,
8% by weight, based on the total weight of nonanoic acid and ketoacids having the formula (I), of ketoacids having the formula (I).

Mixture (hereinafter denoted "mixture C") containing:
90% by weight, based on the total weight of nonanoic acid and ketoacids having the formula (I), of nonanoic acid,
10% by weight, based on the total weight of nonanoic acid and ketoacids having the formula (I), of ketoacids having the formula (I).

Mixture (hereinafter denoted "mixture D") containing:
75% by weight, based on the total weight of nonanoic acid and ketoacids having the formula (I), of nonanoic acid,
25% by weight, based on the total weight of nonanoic acid and ketoacids having the formula (I), of ketoacids having the formula (I).

Mixture (hereinafter denoted "mixture E") containing:
43% by weight, based on the total weight of nonanoic acid and ketoacids having the formula (I), of nonanoic acid,
57% by weight, based on the total weight of nonanoic acid and ketoacids having the formula (I), of ketoacids having the formula (I).

The nonanoic acid of mixtures A-E was obtained by an oxidative cleavage process from sunflower oil.

The ketoacids having the formula (I) of mixtures A-E were in the form of a mixture consisting of $CH_3$—$(CH_2)_{m'}$—$C(O)$—$CH_2$—$COOH$ (I-A), wherein m' is 4 or 5, and $CH_3$—$(CH_2)_{m''}$-$C(O)$—$CH_2$—$CH_2$—$COOH$ (I-B), wherein m" is 3 or 4.

Herbicidal formulation commercially available under the trade name BELOUKHA® containing 71.96% by weight of nonanoic acid and up to 100% by weight of emulsifying agents (label authorized by Italian Executive Decree of 26 Feb. 2016) (hereinafter denoted "herbicidal formulation 1").

Polyoxyethylene sorbitan monooleate containing 20 moles of oxyethylene units (HLB: 15.0) (hereinafter denoted "emulsifying agent A").

Polyethoxylated castor oil containing 36 moles of oxyethylene units (HLB: 13.2) (hereinafter denoted "emulsifying agent B").

EXAMPLE 1

A composition was prepared by mixing mixture A with emulsifying agent A.

The resultant composition contains 72% by weight of mixture A and 28% by weight of emulsifying agent A.

EXAMPLE 2

A composition was prepared by mixing mixture B with emulsifying agent A.

The resultant composition contains 72% by weight of mixture B and 28% by weight of emulsifying agent A.

EXAMPLE 3

A composition was prepared according to the procedure set out in Example 1, but mixing mixture C with emulsifying agent B.

EXAMPLE 4

A composition was prepared according to the procedure set out in Example 1, but mixing mixture D with emulsifying agent B.

EXAMPLE 5

A composition was prepared according to the procedure set out in Example 1, but mixing mixture E with emulsifying agent B.

The compositions of any of Examples 1-5 have high stability and may advantageously be diluted in water so as to give rise to a stable, water-based emulsion.

In particular, the compositions of any of Examples 1-5 were diluted in water so as to obtain aqueous emulsions having a final concentration of 8% by volume, based on the total volume of the aqueous emulsion.

The stability of the resultant aqueous emulsions was tested at 20° C. according to CIPAC standard method MT 36 at various time intervals (after the passage of 10 minutes, 30 minutes, 1 hour and 24 hours from dilution in water under the above-mentioned conditions).

The aqueous emulsion is deemed stable when no phase separation is observed.

The results are shown in Table 1.

COMPARATIVE EXAMPLE 1

An aqueous composition was prepared by diluting Herbicidal Formulation 1 in water at a final concentration of 8% by volume, based on the total volume of the aqueous composition.

The stability of the aqueous emulsion of Comparative example 1 was tested at 20° C. according to CIPAC standard method MT 36 at various time intervals (after the passage of 10 minutes, 30 minutes, 1 hour and 24 hours from dilution in water under the above-mentioned conditions).

The results are shown in Table 1.

TABLE 1

| | Stability [CIPAC MT 18, 20° C.] | | | | |
|---|---|---|---|---|---|
| | 0 min | 10 min | 30 min | 1 h | 24 h |
| Example 1 | stable | stable | stable | stable | stable |
| Example 2 | stable | stable | stable | stable | stable |
| C. Example 1 | stable | stable | unstable | unstable | unstable |

As shown by the results set out in Table 1, the aqueous emulsion according to the present invention as represented for example by the aqueous emulsion of each of Examples 1 and 2 according to the invention is surprisingly stable at 20° C. and no phase separation is observed even after 24 hours from dilution in water.

The aqueous emulsion according to the invention does not foam and may advantageously be stored before use.

In contrast, the aqueous composition of Comparative Example 1 disadvantageously exhibits phase separation after just 10 minutes from dilution in water.

COMPARATIVE EXAMPLE 2

A composition was prepared by mixing nonanoic acid with emulsifying agent B.

The resultant composition contains:
- 72% by weight, based on the total weight of the composition, of nonanoic acid, and
- 28% by weight, based on the total weight of the composition, of emulsifying agent B.

The composition so obtained was diluted in water so as to obtain a stable aqueous emulsion having a final concentration of 8% by volume, based on the total volume of the aqueous emulsion.

The herbicidal activity of the composition of any of Examples 3-5 according to the present invention was furthermore tested on dicotyledons such as *Artemisia vulgaris* L. and *Potentilla reptans* L. and compared with the herbicidal activity of the composition of Comparative Example 2.

The herbicidal effectiveness was evaluated at a field dose of 16 l/ha (distributed with 300 l of water per ha) on the basis of weight reduction of dry substance after treatment with respect to untreated dry substance.

A slit-plot experimental design with three replications represented by 3 plots of 20 m² each was applied in the study. To quantify the herbicidal effectiveness of the compositions, all treatments were sprayed on *Artemisia vulgaris* L. and *Potentilla reptans* L. plants at 2-3 leaf growth stages using a backpack sprayer in open field conditions. For each thesis, above-ground biomass of each weed was harvested at 7 and 12 DAA (Days After Application), oven-dried at 105±1° C. until constant weight was reached and weighed to determine the dry matter (DM) content and the dry weight of the abovementioned samples.

Higher the weight reduction of dry substance after treatment to untreated dry substance after 7 days, preferably after 12 days, higher the herbicidal effectiveness.

The results are shown in Table 2.

As shown by the results set out in Table 2, the composition of any of Examples 3-5 according to the invention unexpectedly exhibits a longer period of control of weed plants as compared to the composition of Comparative Example 2.

TABLE 2

| | Herbicidal effectiveness | | | |
| | *Artemisia vulgaris* L. | | *Potentilla reptans* L. | |
| | after 7 days | after 12 days | after 7 days | after 12 days |
|---|---|---|---|---|
| Example 3 | 88.9 | 89.9 | 59.9 | 89.5 |
| Example 4 | 88.0 | 59.5 | 89.6 | 89.2 |
| Example 5 | 81.5 | 63.7 | 69.6 | 85.5 |
| C. Example 2 | 74.2 | 49.3 | 68.6 | 71.7 |

The invention claimed is:

1. A herbicidal composition comprising:
   a) a mixture of saturated aliphatic monocarboxylic acids comprising:
      nonanoic acid, and
      at least one ketoacid having the formula (I):

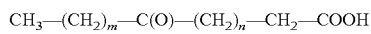

$CH_3-(CH_2)_m-C(O)-(CH_2)_n-CH_2-COOH$ wherein the sum (m+n) equals 4 or 5, with m and n which individually represent 0 or an integer selected from 1, 2, 3, 4 and 5, and
   b) an emulsifying agent,
   in which the mixture of saturated aliphatic monocarboxylic acids comprises:
      20-99% by weight, based on the total weight of nonanoic acid and at least one ketoacid having the formula (I), of nonanoiic acid, and
      1-80% by weight, based on the total weight of nonanoic acid and at least one ketoacid having the formula (I), of said ketoacid having the formula (I).

2. The herbicidal composition according to claim 1, in which the mixture of saturated aliphatic monocarboxylic acids comprises:
   25-99% by weight, based on the total weight of nonanoic acid and at least one ketoacid having the formula (I), of nonanoic acid, and
   1-75% by weight, based on the total weight of nonanoic acid and at least one ketoacid having the formula (I), of said ketoacid having the formula (I).

3. The herbicidal composition according to claim 2, in which the emulsifying agent comprises at least one surfactant selected from the group consisting of nonionic surfactants and amphoteric surfactants.

4. An aqueous emulsion comprising:
   the herbicidal composition according to claim 2, and
   an aqueous phase.

5. The herbicidal composition according to claim 1, in which the mixture of saturated aliphatic monocarboxylic acids comprises:
   50-99% by weight, based on the total weight of nonanoic acid and at least one ketoacid having the formula (I), of nonanoic acid, and
   1-50% by weight, based on the total weight of nonanoic acid and at least one ketoacid having the formula (I), of said ketoacid having the formula (I).

6. The herbicidal composition according to claim 5, in which the emulsifying agent comprises at least one surfactant selected from the group consisting of nonionic surfactants and amphoteric surfactants.

7. An aqueous emulsion comprising:
   the herbicidal composition according to claim 5, and
   an aqueous phase.

8. The herbicidal composition according to claim 1, said composition comprising:
   a) 10-85% by weight, based on the total weight of the composition, of said mixture of saturated aliphatic monocarboxylic acids,
   b) 5-40% by weight, based on the total weight of the composition, of said emulsifying agent,
   c) 0-50% by weight, based on the total weight of the composition, of at least one solvent, and
   d) 0-30% by weight, based on the total weight of the composition, of water.

9. The herbicidal composition according to claim 8, in which the emulsifying agent comprises at least one surfactant selected from the group consisting of nonionic surfactants and amphoteric surfactants.

10. An aqueous emulsion comprising:
    the herbicidal composition according to claim 8, and
    an aqueous phase.

11. The herbicidal composition according to claim 1, in which the emulsifying agent comprises at least one surfactant selected from the group consisting of nonionic surfactants and amphoteric surfactants.

12. The herbicidal composition according to claim 11, in which the nonionic surfactant is selected from the group consisting of alkoxylated alcohols, alkoxylated tristyrylphenols, polyethoxylated fatty acid esters and polyethoxylated vegetable oils.

13. An aqueous emulsion comprising:
the herbicidal composition according to claim 11, and
an aqueous phase.

14. An aqueous emulsion comprising:
the herbicidalcomposition according to claim 1, and
an aqueous phase.

15. The aqueous emulsion according to claim 14, said aqueous emulsion comprising:
0.1-10% by volume, based on the total volume of the aqueous emulsion, of the herbicidal composition, and
90-99.9% by volume, based on the total volume of the aqueous emulsion, of an aqueous phase.

16. A method for controlling or suppressing plant growth, said method comprising application of the aqueous emulsion according to claim 14 to the plant.

* * * * *